(12) United States Patent
Zhang et al.

(10) Patent No.: US 11,240,121 B2
(45) Date of Patent: Feb. 1, 2022

(54) METHODS AND SYSTEMS FOR CONTROLLING DATA BACKUP

(71) Applicant: EMC IP Holding Company LLC, Hopkinton, MA (US)

(72) Inventors: Simon Yuting Zhang, Chengdu (CN); Gluth Xuedong Gao, Shanghai (CN); Felix Fei Peng, Chengdu (CN); Eddie Wenhao Dai, Chengdu (CN); Aaron Chao Lin, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 193 days.

(21) Appl. No.: 15/954,948

(22) Filed: Apr. 17, 2018

(65) Prior Publication Data

US 2018/0302297 A1    Oct. 18, 2018

(30) Foreign Application Priority Data

Apr. 17, 2017  (CN) .......................... 201710250379.5

(51) Int. Cl.

| H04L 12/26 | (2006.01) |
|---|---|
| H04L 12/24 | (2006.01) |
| H04L 29/08 | (2006.01) |
| G06N 5/00 | (2006.01) |
| G06N 20/00 | (2019.01) |

(Continued)

(52) U.S. Cl.
CPC ............ *H04L 41/16* (2013.01); *G06F 3/0605* (2013.01); *G06F 3/065* (2013.01); *G06F 3/067* (2013.01); *G06N 5/003* (2013.01); *G06N 20/00* (2019.01); *H04L 41/0816* (2013.01); *H04L 41/0823* (2013.01); *H04L 67/1095* (2013.01); *H04L 67/2823* (2013.01); *G06N 3/08* (2013.01); *H04L 41/145* (2013.01)

(58) Field of Classification Search
CPC ........................ H04L 41/0816; H04L 67/1095
USPC ......................................................... 709/224
See application file for complete search history.

(56) References Cited

U.S. PATENT DOCUMENTS

| 8,191,084 | B1 | 5/2012 | Todd et al. |
|---|---|---|---|
| 8,782,784 | B1 | 7/2014 | Bruskin |
| 8,819,203 | B1 | 8/2014 | Todd et al. |

(Continued)

FOREIGN PATENT DOCUMENTS

| CN | 102414673 | 4/2012 |
|---|---|---|
| CN | 102573053 | 7/2012 |

(Continued)

*Primary Examiner* — Suraj M Joshi
*Assistant Examiner* — Sherman Lin
(74) *Attorney, Agent, or Firm* — BainwoodHuang

(57) ABSTRACT

Implementations of the subject matter described herein provide methods and systems of controlling data backup, and a computer readable storage medium. The method comprises: obtaining test data for performing data backup with a plurality of backup solutions, the plurality of backup solutions being associated with each set of values amongst a plurality of sets of values of a plurality of factors affecting the data backup; generating a training sample set based on comparison of the test data; converting the training sample set into a decision model for controlling data backup; and optimizing the decision model based on the configuration parameters obtained by performing data backup with the decision model.

10 Claims, 11 Drawing Sheets

(51) Int. Cl.
*G06F 3/06* (2006.01)
*G06N 3/08* (2006.01)

(56) References Cited

U.S. PATENT DOCUMENTS

| | | | | |
|---|---|---|---|---|
| 9,424,074 | B1* | 8/2016 | Pjesivac-Grbovic | G06F 9/48 |
| 10,038,709 | B1 | 7/2018 | Wittenstein et al. | |
| 10,289,320 | B1 | 5/2019 | Wigmore | |
| 2003/0009467 | A1* | 1/2003 | Perrizo | G06F 16/9027 |
| 2004/0172512 | A1* | 9/2004 | Nakanishi | G06F 11/1458 |
| | | | | 711/162 |
| 2005/0044446 | A1 | 2/2005 | Sakurai | |
| 2006/0026110 | A1* | 2/2006 | Fan | G06N 20/00 |
| | | | | 706/12 |
| 2010/0262693 | A1* | 10/2010 | Stokes | H04L 63/1408 |
| | | | | 709/225 |
| 2010/0269168 | A1* | 10/2010 | Hegli | G06F 21/577 |
| | | | | 726/11 |
| 2016/0342481 | A1* | 11/2016 | Nanivadekar | G06F 11/1469 |

FOREIGN PATENT DOCUMENTS

| | | |
|---|---|---|
| CN | 103744620 | 4/2014 |
| CN | 105512163 | 4/2016 |

\* cited by examiner

METHODS AND SYSTEMS FOR CONTROLLING DATA BACKUP

RELATED APPLICATION

This application claim priority from Chinese Patent Application Number CN201710250379.5, filed on Apr. 17, 2017 at the State Intellectual Property Office, China, titled "METHODS AND SYSTEMS FOR CONTROLLING DATA BACKUP" the contents of which is herein incorporated by reference in its entirety.

FIELD

The present disclosure relates to the field of data backup, and more specifically to methods and systems for controlling data backup.

BACKGROUND

Modern data replication technology is usually capable of selecting different backup schemes according the type of data to be backed up, data size, a network environment where a backup device is in, and storage position of the backup data. Factors such as the data type, data size, a network environment where a backup device is in, and storage position of the backup data usually affect selection of a backup scheme. Different data backup schemes substantially vary in time for performing data backup and the number of bytes sent via a network between backup devices. Therefore, how to control data backup in a specific backup scenario and thereby select the most suitable backup solution is a problem urgently to be solved in the prior art.

SUMMARY

The subject matter described herein provides a method for controlling data backup, which can select a suitable data backup solution with respect to different factors affecting data backup.

In a first aspect of the present disclosure, there is provided a method for controlling data backup. The method comprises: obtaining test data for performing data backup with a plurality of backup solutions, the plurality of backup solutions being associated with each set of values amongst a plurality of sets of values of a plurality of factors affecting the data backup; generating a training sample set based on comparison of the test data; converting the training sample set into a decision model for controlling data backup; and optimizing the decision model based on configuration parameters obtained by performing data backup with the decision model.

In a second aspect of the present disclosure, there is provided a system for controlling data backup. The system comprises: a storage unit configured to store one or more programs and a decision model for controlling selection of a data backup solution, and a processor coupled to the storage unit and configured to execute one or more programs to cause the system to perform acts including: obtaining test data for performing data backup with a plurality of backup solutions, the plurality of backup solutions being associated with each set of values amongst a plurality of sets of values of a plurality of factors affecting the data backup; generating a training sample set based on comparison of the test data; converting the training sample set into a decision model for controlling data backup; and optimizing the decision model based on configuration parameters obtained by performing data backup with the decision model.

In addition, the present disclosure further provides a method for controlling data backup, which can use the client's actual replication data to quickly optimize a control decision of the data backup.

In a third aspect of the present disclosure, there is provided a method of controlling data backup. The method comprises: storing a decision model for controlling selection of a data backup solution on a shared storage unit, the decision model being associated with values of a plurality of factors affecting the data backup and their corresponding backup solutions; obtaining the configuration parameter by using the decision model to perform data backup by a client; performing, based on the configuration parameter, incremental sample training to optimize the decision model; and controlling the data backup based on the optimized decision model.

In a fourth aspect of the present disclosure, there is provided a system for controlling data backup. The system comprises: a storage unit configured to store one or more programs, and a processor coupled to the storage unit and configured to execute the one or more programs to cause the system to perform acts including: storing a decision model for controlling selection of a data backup solution in a shared storage unit, the decision model being associated with values of a plurality of factors affecting the data backup and their corresponding backup solutions; obtaining configuration parameter by using the decision model to perform the data backup by a client; performing, based on the configuration parameter, incremental sample training to optimize the decision model; and controlling the data backup based on the optimized decision model.

In a fifth aspect of the present disclosure, there is provided a computer-readable storage medium. The computer-readable storage medium having one or more computer programs stored thereon, the programs, when executed by a processor, implementing the method of controlling data backup according to a first or third aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objects, features and advantages of the present disclosure will be made more apparent by describing exemplary embodiments of the present disclosure in more detail with reference to figures, wherein identical reference signs represent identical parts in the exemplary embodiments of the present disclosure.

DETAILED DESCRIPTION

Figure 1:
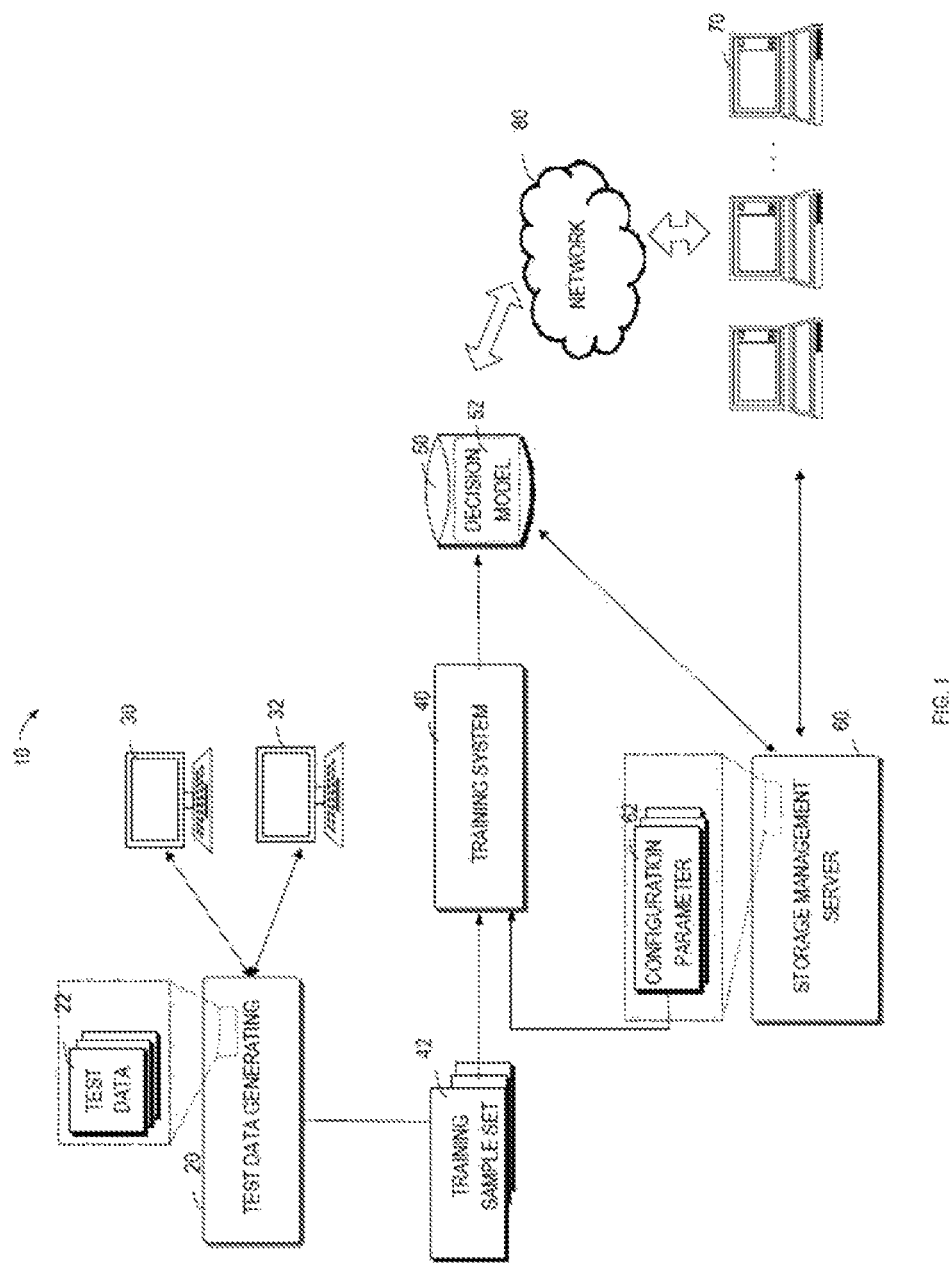
FIG. 1 illustrates a block diagram of a system 10 for controlling data backup in which implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Conventionally, there are two kinds of method of controlling data backing up. The first kind of method relate to selecting a backup solution based on a fixed rule which is derived from a long-term accumulation of experience intuition of those skill in the art. The use of fixed rule to determine the data backup solution has the following drawbacks: on the one hand, situations considered in the fixed rule usually cannot cover all backup scenarios; on the other hand, as for some situations, e.g., situations in which attribute values are continuous values, people's experience is limited, and even might be inaccurate.

Another kind of methods relate to selecting a backup solution based on a KNN matching algorithm. The method of controlling data backup based on the KNN matching algorithm usually determines the most appropriate backup solution by calculating similarity of two feature (attributes) vectors. This method depends on historical backup data very much. Therefore, in the absence of historical backup data, the method for controlling data backup based on the KNN matching algorithm might cause determination of an incorrect type and thereby causes wrong selection of a backup solution.

As described above, a conventional method for controlling data backup are usually making a decision on backup solution based on a fixed rule. In these methods, factors, affecting data backup, considered in the fixed rule usually cannot cover all backup scenarios; in addition, the fixed rule summarized based on people's limited experience is usually not accurate enough.

In recent years, a machine learning algorithm prediction model is used to optimize a decision procedure under different application scenarios. In these decision procedures, it is usual to perform machine learning and summarization based on specific input data, form and predict an output value within a certain probability interval, and use the output value to optimize the decision. Therefore, in inference, this decision optimizing procedure based on the machine learning algorithm prediction model may automatically summarize an intrinsic association between the data and the decision, and thereby substantially avoid limitations in artificially determining decision rules, and further improve the decision efficiency and accuracy. However, general machine learning algorithm needs to perform repeated training for all sample data, is time-consuming and involves complicated computing, and is not adapted to meet requirements for quickly backing up massive data in a cluster system. In addition, general machine learning algorithm does not support optimization of a plurality of variables, and is not adapted to be directly applied to a solution for controlling data backup to decide an application scenario affected by the plurality of variables. Therefore, the present disclosure provides ideas to solve problems such as how to select a suitable machine learning algorithm and how to specifically combine the machine learning algorithm with the decision scenario of controlling data backup, to reduce consumption of the memory, reduce the computing complexity, improve the efficiency and accuracy of the decision for controlling data backup, and the like.

Basic principles and several example implementations of the present disclosure will be illustrated with reference to figures.

FIG. 1 illustrates a block diagram of a system 10 for controlling data backup in which implementations of the subject matter described herein can be implemented. It should be appreciated that the system 10 shown in FIG. 1 is merely for illustration but not limit the function and scope of implementations of the subject matter described herein in any manners. As shown in FIG. 1, the system 10 comprises a test data generating device 20, a first data storage system 30 and a second data storage system 32 for generating test data, a training system 40, a shared storage device 50, a storage management server 60, a client 70 and a network 80.

Figure 2:
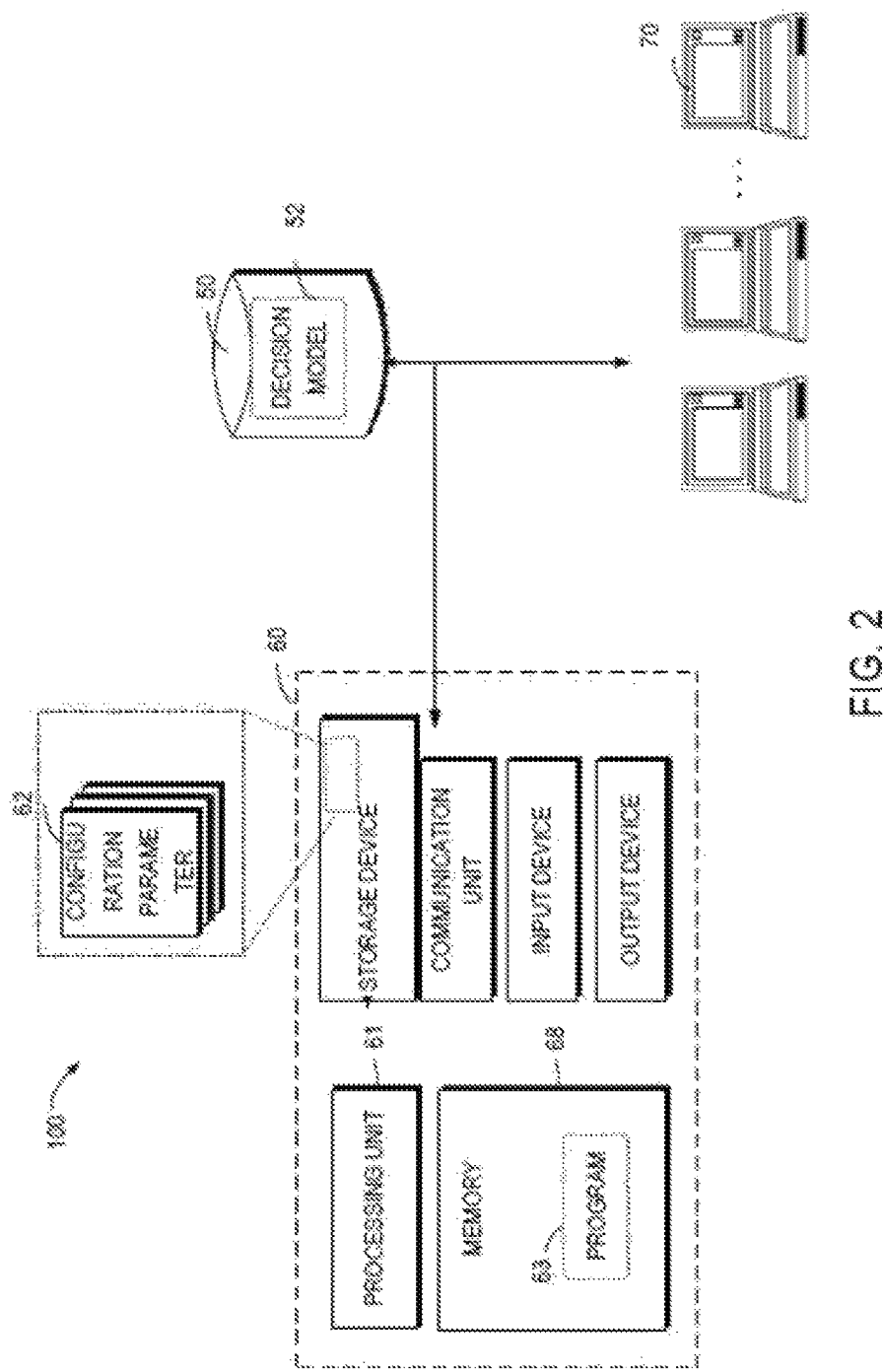
FIG. 2 illustrates a schematic diagram of an interaction scenario 100 of a storage management server and a client for controlling data backup according to an implementation of the subject matter described herein.

In some implementations, the shared storage device 50, the storage management server 60 and the client may interact in the manner as shown in FIG. 2. FIG. 2 illustrates a schematic diagram of an interaction scenario 100 of the storage management server and the client for controlling data backup according to an implementation of the subject matter described herein. As shown in FIG. 2, the storage management server 60 is used to capture data from a plurality of clients 70 and store the data in the shared storage unit 50 via a network 80 (not shown in FIG. 2), for example, the storage management server 60 may invoke, store and process configuration parameters 62 of clients 70, e.g., call the client's home data, to execute the data backup online. The client 70 may directly capture data from the shared storage unit 50, e.g., capture a decision model 52. The storage management server 60 may maintain the decision model 52 in the storage unit 50. The storage management server 60 for example may comprise one or more processing units 61 and a memory 68. One or more programs 63 are stored on the memory 68; the processing unit 61 is coupled to the memory to execute one or more programs 63 to perform each operation or action of the method of controlling the client data backup.

In some implementations, the client 70 may be implemented as various user terminals or service terminals. The service terminals may be a server or large-sized computing device or the like provided by the service provider. The user terminals are for example any type of mobile terminals, fixed terminals, or portable terminals, including a mobile phone, a site, a unit, a device, a multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, game device, or any combination thereof, including the accessories and peripherals of these devices, or any combination thereof.

In some implementations, as shown in FIG. 1, the first data storage system 30, the second data storage system 32 or the storage management server 60 may be a server, a large computing device or the like. The storage management server 60 may comprise components such as the memory 62 and processing units 61. The shared storage device 50 may be implemented by various storage media, and include but not limited to volatile and non-volatile media, and removable and non-removable media. The network 80 may be any wired or wireless network, for example, the Internet, local area network (WLAN) and intranet, which is capable of providing communication between devices.

In some implementations, the test data generating device 20 and the training system 40 may be dedicated processing devices and may be implemented by corresponding program modules, for example, implemented by program instructions stored in the memory 68 of the storage management server 60.

As shown in FIG. 1, the test data generating device 20, based on each set of preset values of a plurality of factors, uses a plurality of backup solutions between the first data storage system 30 and second data storage system 32 for test data generation, preferably perform real data backup procedures with all backup solutions, to produce test data. The test data generating device 20 further, based on each set of preset values for a plurality of factors affecting the data backup, compares effects of performing data backup with different backup solutions, for example, compare time for performing data backup; select a backup solution which spends time smaller than a threshold, or select the backup solution which spends the least time to generate a training sample in a training sample set 42.

As shown in FIG. 1, the training system 40, based on a predetermined algorithm, converts the training sample set into the decision model 52 for controlling data backup, e.g., converts into a decision tree having the factors as attributes. The decision model 52 is stored in the shared storage device 50. The client 70 performs data backup online with the decision model, and the storage management server 60, via the network 80, collects configuration parameters 62 obtained by the client 70 performing data backup. The configuration parameters 62 at least comprise information about backup solutions, factors and their values associated with the backup solutions, and backup effects. The configuration parameters 62 are for example client's home data. The training system 40 generates an incremental training sample based on the configuration parameters 62, and trains the incremental training sample by using a predetermined algorithm (needless to perform re-learning for all training sample sets) to optimize the decision model 52 (e.g., a decision tree) stored in the shared storage device 50. The client 70 controls data backup according to the optimized decision model 52 stored in the shared storage device 50.

Figure 3:
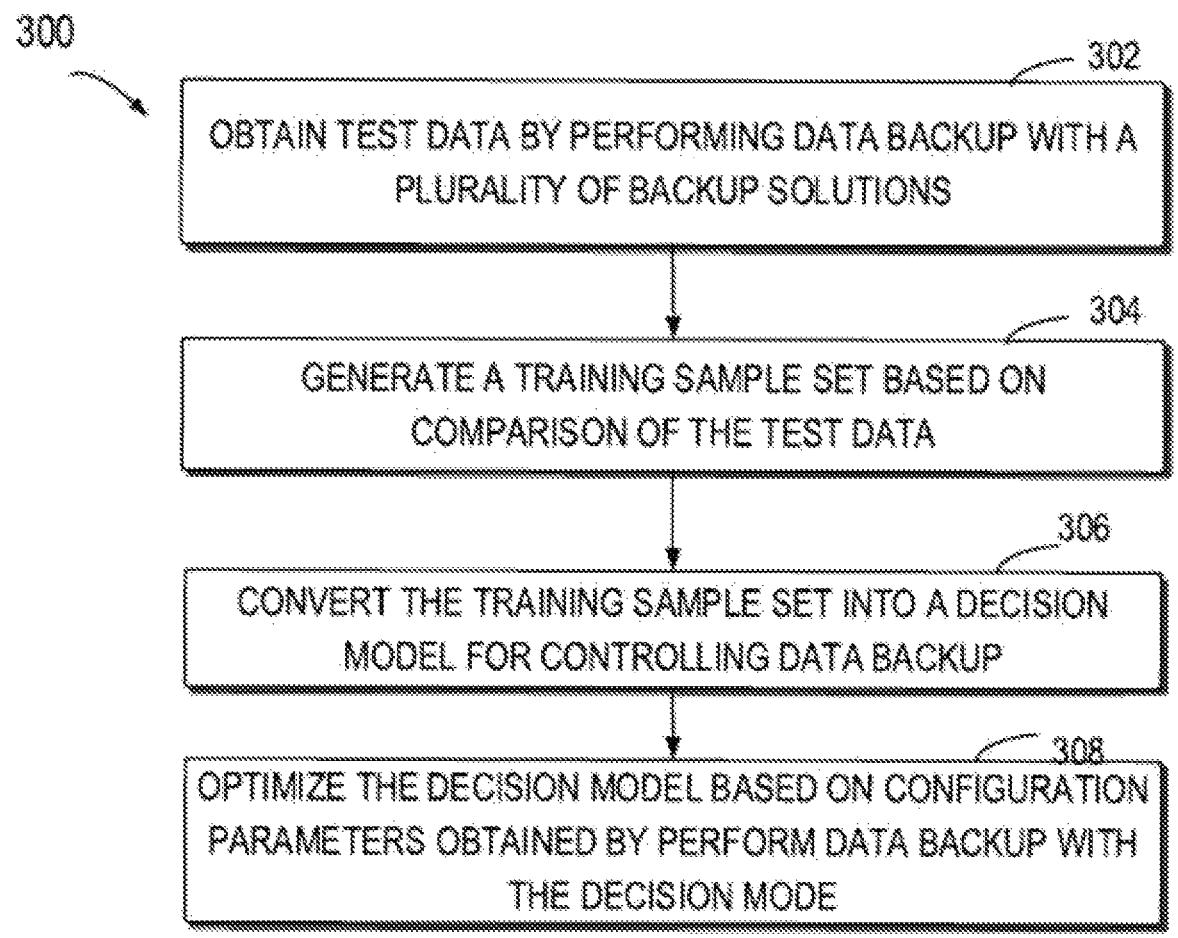
FIG. 3 illustrates a flow chart of a method 300 for controlling data backup according to an implementation of the subject matter described herein.

FIG. 3 illustrates a flow chart of a method 300 for controlling data backup according to an implementation of the subject matter described herein. The method 300 may be performed by the storage management server 60, for example, a controller or processing device in the storage management server 60.

At block 302, test data for performing data backup with the plurality of backup solutions are obtained for each set of values in the plurality of sets of values of multiple factors affecting data backup. In some implementations, the plurality of factors affecting data backup may comprise: the size of data to be backed up, a proportion of new bytes relative to last backup data (hereinafter referred to as "a proportion of new bytes"), an average storage segment size, a minimum storage segment size, a maximum storage segment size, a total number of storage segments, the number of files to be backed up, a bandwidth of a network between a device performing backup and a device to be backed up, and a network round-trip time (RTT) between the device performing the backup and the device to be backed up. The most-matched backup solution which is selected for different values of these factors might be different.

Figure 4:
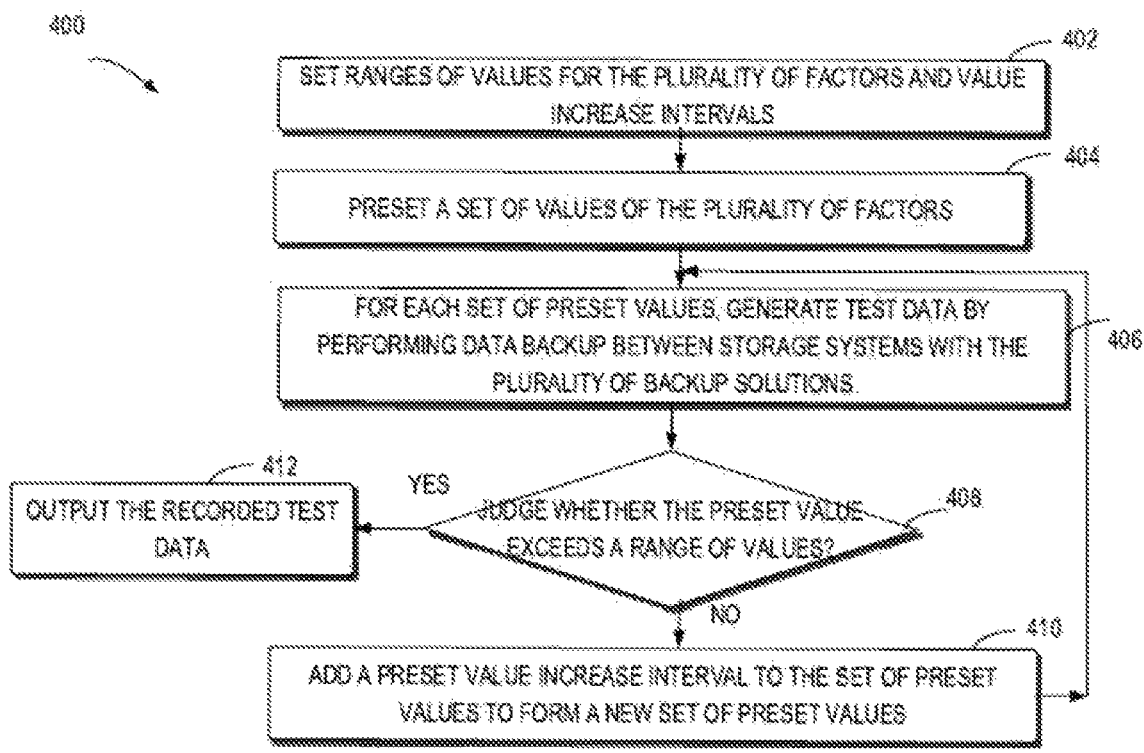
FIG. 4 illustrates a flow chart of a method 400 for generating test data according to an implementation of the subject matter described herein.

In some implementations, each set of values in a plurality of sets of values of multiple factors may be implemented through acts from block 402 to block 404 as shown in FIG. 4. FIG. 4 illustrates a flow chart of a method 400 for generating test data according to an implementation of the subject matter described herein. At block 402, set a range of values of the plurality of factors and a value increase interval. For example, the following table 1 exemplarily illustrates the range of values of nine factors and the value of the value increase intervals. The meaning of the so-called range of values is a range of between a minimum and a maximum value of the factor. The so-called value increase interval refers to an increased value of each set of preset value relative to the preceding set of preset value. For example, as for the factor the size of data to be replicated, a preset range of value is for example 20 KB-12 TB, and the value increase interval is for example 100 MB. Its meaning is that during generation of the test data, a minimum preset value of the factor "the size of data" to be replicated is for example 20 KB, and "the maximum preset value" is for example 12 TB. Each value of the factor "the size of data" to be replicated for example increases with an interval of 100 MB. Emphatically, these values are only exemplary and not intended to limit the scope of the present disclosure in any way.

TABLE 1

| Factors that exert an impact | Range of values | Value increase interval |
|---|---|---|
| Size of data to be replicated | 20 KB~12 TB | 100 MB |
| proportion of new bytes | 1%~70% | 2% |
| Average storage segment size | 4 KB~40 MB | 10 KB |
| Minimum storage segment size | 100 B~40 MB | 10 KB |
| Maximum storage segment size | 100 B~40 MB | 10 KB |
| Total number of storage segments | 1~2 ^ 32 | 10 |
| Number of files to be backed up | 1~2 ^ 64 | 100 |

TABLE 1-continued

| Factors that exert an impact | Range of values | Value increase interval |
|---|---|---|
| bandwidth of a network between backup devices | 10 Mbps~10 Gbps | 100 Mbps |
| Network round-trip time between backup devices | 1 ms~200 ms | 20 ms |

After the range of values of the plurality of factors and the value increase interval are set, a set of values of the plurality of factors are preset, namely, block 404. For example, the following table 2 exemplarily illustrates a set of preset values of nine factors. Values in Table 2 are only exemplary and not intended to limit the scope of the present disclosure in any way. For example, in the set of preset values, the value of the factor "the size of data" to be replicated is for example 200G, the value of the factor "the proportion of new bytes" is for example 1%, the value of the factor "the average storage segment size" is for example 4 KB, the value of the factor "the minimum storage segment size" is for example 100B, the value of the factor "the maximum storage segment size" is for example 4 MB, the value of the factor "the total number of storage segments" is for example 547, the value of the factor "the number of files to be backed up" is for example 143, the value of the factor of "the bandwidth of a network between backup devices" is for example 10 Mbps, and the value of the factor the network round-trip time between backup devices is for example 1 ms. Emphatically, these values are only exemplary and not intended to limit the scope of the present disclosure in any way.

TABLE 2

| Factors that exert an impact | Values |
|---|---|
| Size of data to be replicated | 200 G |
| proportion of new bytes | 1% |
| Average storage segment size | 4 KB |
| Minimum storage segment size | 100 B |
| Maximum storage segment size | 4 MB |
| Total number of storage segments | 547 |
| Number of files to be backed up | 143 |
| Bandwidth of a network between backup devices | 10 Mbps |
| Network round-trip time between backup devices | 1 ms |

In some implementations, obtaining test data for performing data backup with the plurality of backup solutions for each set of values may be implemented through acts from block 406 to block 412 as shown in FIG. 4. At block 406, for each set of preset values (e.g., the values shown in Table 2), respectively perform real data backup with the plurality of backup solutions (e.g., backup solutions 1-4) between the first data storage system 30 and second data storage system 32, and thereby generate a set of test data. The set of test data, for example, includes test data for performing data backup with backup solution 1, test data with backup solution 2, test data with backup solution 3, and test data with backup solution 4. At block 408, judge whether the set of preset values go beyond the preset range of values of factors. At block 410, if the set of preset values do not go beyond the preset range of values, add a preset value increase interval to said set of preset values of nine factors to form a new set of preset values. For each new set of preset values, generate each set of test data by respectively performing real data backup between the first data storage system 30 and second data storage system 32 with multiple backup solutions (e.g., backup solutions 1-4). At block 412, if the set of preset values has already gone beyond the preset range of values, output recorded test data.

Figure 5:
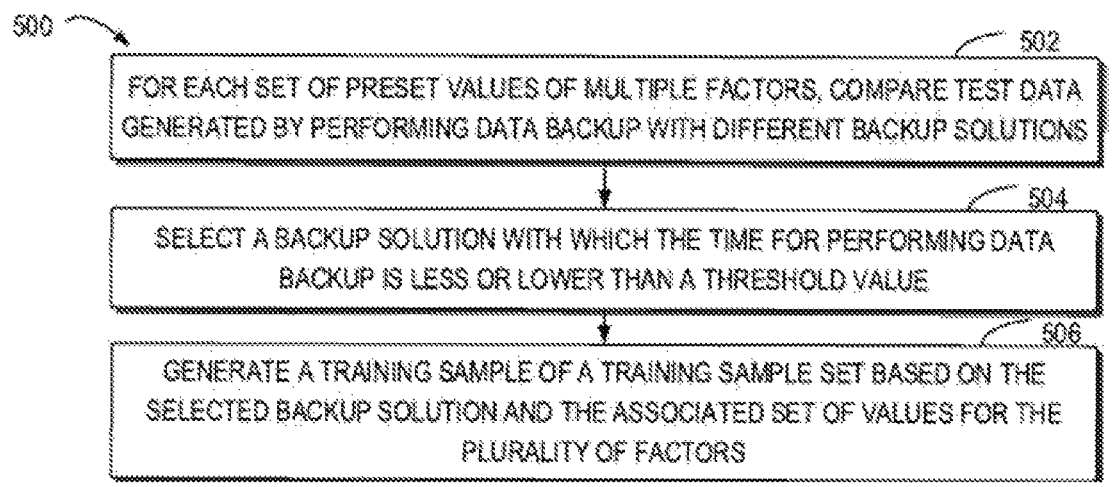
FIG. 5 illustrates a flow chart of a method 500 for generating training sample set according to an implementation of the subject matter described herein.

At block 304, a training sample set is generated based on comparison of test data. In some implementations, generating the training sample set based on comparison of test data may be implemented in the manner of block 502 to block 506 as shown in FIG. 5. FIG. 5 illustrates a flow chart of a method 500 for generating training sample set according to an implementation of the subject matter described herein. At Block 502, for each set of preset values of multiple factors, comparing test data generated by performing data backup with different backup solutions. For example, for the preset values shown in Table 2, comparing backup effect information in test data generated with backup solution 1, test data generated with back solution 2, test data generated with backup solution 3 and test data generated with backup solution 4. For example, Table 3 exemplarily shows partial backup effect information in test data generated with backup solutions 1-4, including "time for performing data backup" and "number of bytes sent via the network between backup devices". Emphatically, these values are only exemplary and not intended to limit the scope of the present disclosure in any way.

TABLE 3

| Backup solution | Time for performing data backup | Number of bytes sent via the network between backup devices |
|---|---|---|
| 1 | 0000 h:05 m:29 s | 1,498,638,048 (1.396 GB) |
| 2 | 0000 h:03 m:14 s | 10,867,267,796 (10.12 GB) |
| 3 | 0000 h:06 m:10 s | 5,949,861,888 (5.541 GB) |
| 4 | 0000 h:02 m:47 s | 4,718,062,572 (4.394 GB) |

At block 504, select a backup solution that time for performing data backup is less or lower than a threshold value based on comparing test data generated by with backup solutions 1-4. Then, at block 506 generate a training sample of a training sample set based on the selected backup solution and associated present values of multiple factors. For example, as known from comparison of information about "time for performing data backup" in four test data correspondingly backup solutions 1-4 in Table 3, the time for performing data backup with backup solution 4 is less than the backup solutions 1-3, so the backup solution 4 and the associated preset values of nine factors are selected to generate one training sample in the training sample set 42 shown in FIG. 1. The following Table 4 exemplarily illustrates the training sample. The training sample includes a set of preset values of nine factors and a backup solution best matched with the set of preset values. For each set of preset values of multiple factors, the acts from block 502 to block 506 need to be executed to generate a corresponding training sample as shown in Table 4, until all training samples of the whole training sample set 42 are generated with respect to all sets of preset values of multiple factors. Emphatically, these values in Table 4 are only exemplary and not intended to limit the scope of the present disclosure in any way.

TABLE 4

| Size of data to be replicated | 200 G |
|---|---|
| Proportion of new bytes | 1% |
| Average storage segment size | 4 KB |
| Minimum storage segment size | 100 B |
| Maximum storage segment size | 4 MB |

TABLE 4-continued

| | |
|---|---|
| Total number of storage segments | 547 |
| Number of files to be backed up | 143 |
| bandwidth of a network between backup devices | 10 Mbps |
| Network round-trip time between backup devices | 1 ms |
| Backup solution | 4 |

At block 306, convert the training sample set into a decision model for controlling data backup. In some implementations, the conversion from the training sample set to the decision model may be implemented based on a plurality of predetermined machine learning algorithms. The predetermined machine learning algorithms need to satisfy characteristics in the following two aspects: one is to use supervisory learning to solve the issue of classification of a multi-variable system; the other is that new sampling data support incremental learning. This is because each training sample in the training sample set 42, as shown in Table 4, includes a plurality of factors and their associated backup solutions, that is to say, the conversion from the training sample set 42 to the decision model 52 needs to involve classification of a plurality of variables and a learning procedure. Therefore, the employed machine learning algorithm should use supervisory learning to solve the issue of classification of the multi-variable system. In some implementations, for example, convert, based on a Very Fact Decision Tree (VFDT) algorithm, the training sample set into the decision tree with the plurality of factors as attributes; in some implementations, for example, an artificial neural network algorithm (Learning ++) may be used to create the decision model; in addition, it is further possible to use an incremental support vector machine (SVM) having an online recursion algorithm to convert the training sample set into the decision model for controlling data backup.

In some implementations, for example, convert, based on a Very Fact Decision Tree (VFDT) algorithm, the training sample set into the decision tree structure with the plurality of factors as attributes. Table 5 illustrates partial training samples in the training sample set. These values in Table 5 are only exemplary and not intended to limit the scope of the present disclosure in any way.

Figure 6:
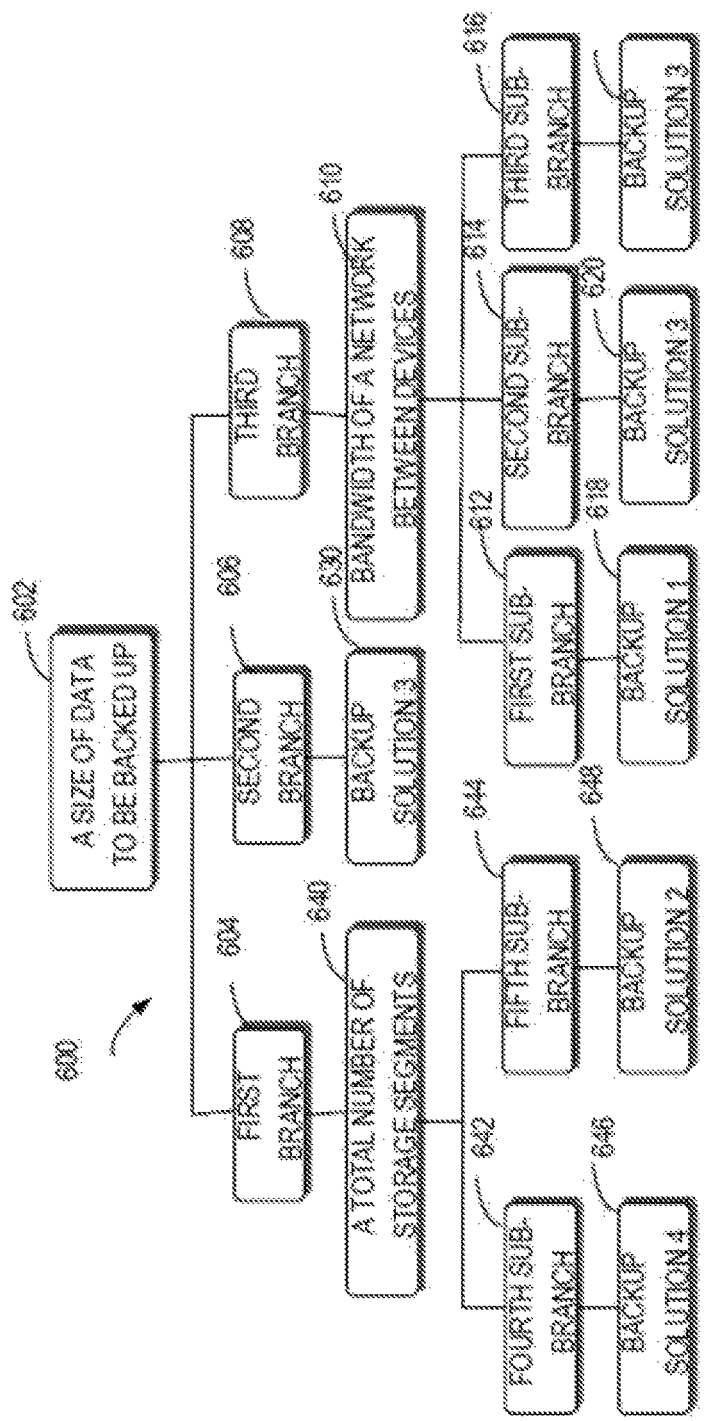
FIG. 6 illustrates a flow chart of a decision tree 600 after a training sample set is converted based on a Very Fast Decision Tree (VFDT) algorithm according to an implementation of the subject matter described herein.

FIG. 6 illustrates a flow chart of a decision tree 600 after a training sample set is converted based on a Very Fast Decision Tree (VFDT) algorithm. An internal node of the decision tree 600 represents one of the factors, a leaf node represents a backup solution for controlling data backup, and a branch from the internal node to the leaf node represents a class based on ranges of values for the factors. As shown in FIG. 6, the internal node 602 in the decision tree 600 is the factor "the size of data to be backed up", different branches, namely, a first branch 604, a second branch 606 and a third branch 608, of the internal node 02 correspond to a class of different values or ranges of values based on the factor the size of data to be backed up, for example, the first branch 604 is a class of the value for example 100M of the factor "the size of data to be backed up", the second branch 606 is a class of the value for example 200M of the factor "the size of data to be backed up", and the third branch 608 is a class of the value for example 2G of the factor "the size of data to be backed up". The leaf node 630 represents backup solution 3 which is matched with the second branch 606. The internal node 610 represent the factor "the bandwidth of a network between backup devices"; and different branches, namely, a first sub-branch 612, a second sub-branch 614 and a third sub-branch 616 of the internal node 610 represent a class of different values or ranges of values for the factor "bandwidth of a network between backup devices". For example, the first sub-branch 612 represent a class of the value, for example 10 Mbps, of the factor "bandwidth of a network", the second sub-branch 614 represent a class of the value for example 100 Mbps of the factor "the bandwidth of a network", and the third sub-branch 616 is a class of the value, for example 200 Mbps, of the factor "bandwidth of a network". The leaf node 618 represent backup solution 1 matched with the first sub-branch 612, the leaf node 620 represent backup solution 3 matched with the second sub-branch 614, and the leaf node 622 represent backup solution 3 matched with the third sub-branch 616. The internal node 640 in the decision tree represent the factor "the total number of storage segments". Different branches, namely, a fourth sub-branch 642 and a fifth sub-branch 644 of the internal node 640 correspond to a class of different values or ranges of values for the factor "the total number of storage segments". For example, the fourth sub-branch 642 represent a class of the value, for example 1, of the factor "the total number of the storage segments", and the fifth sub-branch 644 represent a class of the value, for example 4, of the factor "the total number of the storage segments". The leaf node 646 represent backup solution 4 matched with the fourth sub-branch 642, and the leaf node 648 represent backup solution 2 matched with the fifth sub-branch 644.

As shown in FIG. 6, when the decision tree 600 is used to decide a backup solution, if the size of data to be backed up involved by a current data backup task is 2G and the bandwidth of a network between data backup devices is 10 Mbps, performing data backup with backup solution 1 is recommended and selected according to the decision of the decision tree 600; if the size of current data to be backed up is 100 MB and the total number of storage segments for data backup is 1, performing data backup with backup solution 4 is recommended and selected according to the decision of the decision tree 600. Emphatically, the forgoing values are only exemplary and not intended to limit the scope of the present disclosure in any way.

TABLE 5

| Size of data to be backed up | Proportion of new bytes | Average storage segment size | Minimum storage segment size | Maximum storage segment size | Number of storage segments | Number of files to be backed up | A Bandwidth of a network between | Network round-trip time (RTT) between the devices | Backup solutoin |
|---|---|---|---|---|---|---|---|---|---|
| 100 M | 1% | 4 KB | 100 B | 100 B | 1 | 1 | 10 Mbps | 1 ms | 4 |
| 100 M | 2% | 8 KB | 10 KB | 1 MB | 4 | 5 | 100 Mbps | 10 ms | 2 |
| 200 M | 3% | 12 KB | 30 B | 2 MB | 8 | 23 | 200 Mbps | 20 ms | 3 |
| 2 G | 3% | 12 KB | 30 B | 2 MB | 8 | 23 | 200 Mbps | 20 ms | 3 |

TABLE 5-continued

| Size of data to be backed up | Proportion of new bytes | Average storage segment size | Minimum storage segment size | Maximum storage segment size | Number of storage segments | Number of files to be backed up | A Bandwidth of a network between | Network round-trip time (RTT) between the devices | Backup solutoin |
|---|---|---|---|---|---|---|---|---|---|
| 2 G | 3% | 12 KB | 30 B | 2 MB | 8 | 23 | 10 Mbps | 20 ms | 1 |
| 2 G | 3% | 12 KB | 30 B | 2 MB | 8 | 23 | 1 Gbps | 20 ms | 2 |

Figure 7:
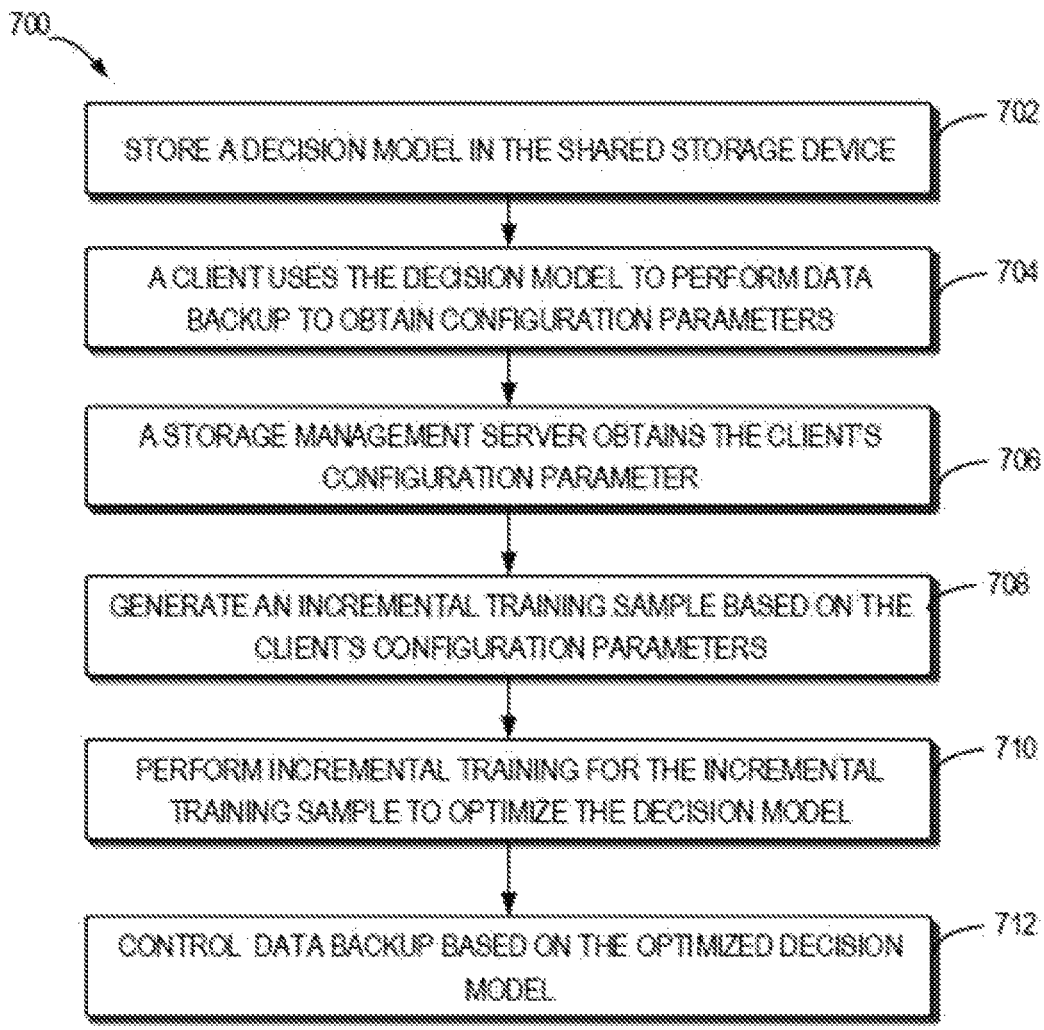
FIG. 7 illustrates a flow chart of a method 700 for optimizing decision model according to an implementation of the subject matter described herein.

At block 308, optimizing the decision model based on configuration parameters obtained by using the decision model to perform the data backup. In some embodiments, this may be implemented through acts from block 702 to block 712 shown in FIG. 7. FIG. 7 illustrates a flow chart of a method 700 for optimizing decision model according to an implementation of the subject matter described herein. As shown in FIG. 7, at block 702, storing the decision model 52 for controlling selection of a data backup solution on a shared storage device 50. At block 704, the client 70 uses the decision model 52 to perform data backup to obtain configuration parameter. At block 706, the storage server 60 obtains the client's configuration parameters, for example, by calling the client 70's home data. At block 708, generate an incremental training sample based on the client's configuration parameters. In some embodiments, the incremental training sample may be generated in the same manner as block 502 to block 506 shown in FIG. 5. Then, at block 710, incremental training is performed for the incremental training sample based on the aforesaid predetermined machine learning algorithm to optimize the decision model 52. Then, at block 712, control data backup based on the optimized decision model 52.

In some embodiments, the above-mentioned predetermined machine learning algorithm satisfying the above characteristics in two aspects may be employed to train the incremental training sample. The characteristics in two aspects include: one is to use supervisory learning to solve the issue of classification of a multi-variable system; the other is that newly-added sampling data support incremental learning. Since the incremental training is only performed for the incremental training sample, rather than for all training sample set, therefore, consumption of the memories is reduced, the computing complexity is meanwhile reduced, and thereby the efficiency of the decision of controlling data backup will be improved. In some embodiments, for example, a Hoeffding decision tree update algorithm may be used to perform the incremental training for the newly-added sample, calculate an information gain of a sample attribute, and decide which node of the decision tree is split according to a Hoeffding boundary, and thereby achieve optimization of the decision model; in some embodiments, for example, an artificial neural network algorithm (Learning ++) may be used to optimize the decision model. The artificial neural network algorithm (Learning ++) was published in 2002, it is an incremental training algorithm of a neural network (NN) mode classifier, the algorithm needn't access previously-used data in a subsequent incremental learning session, and meanwhile does not forget previously-obtained knowledge or model. Therefore, the artificial neural network algorithm (Learning ++) is adapted to train the newly-added samples to optimize the already-existing decision model. In addition, an incremental support vector machine (SVM) having an online recursion algorithm is also adapted to train the newly-added samples to optimize the already-existing decision model.

Figure 8:
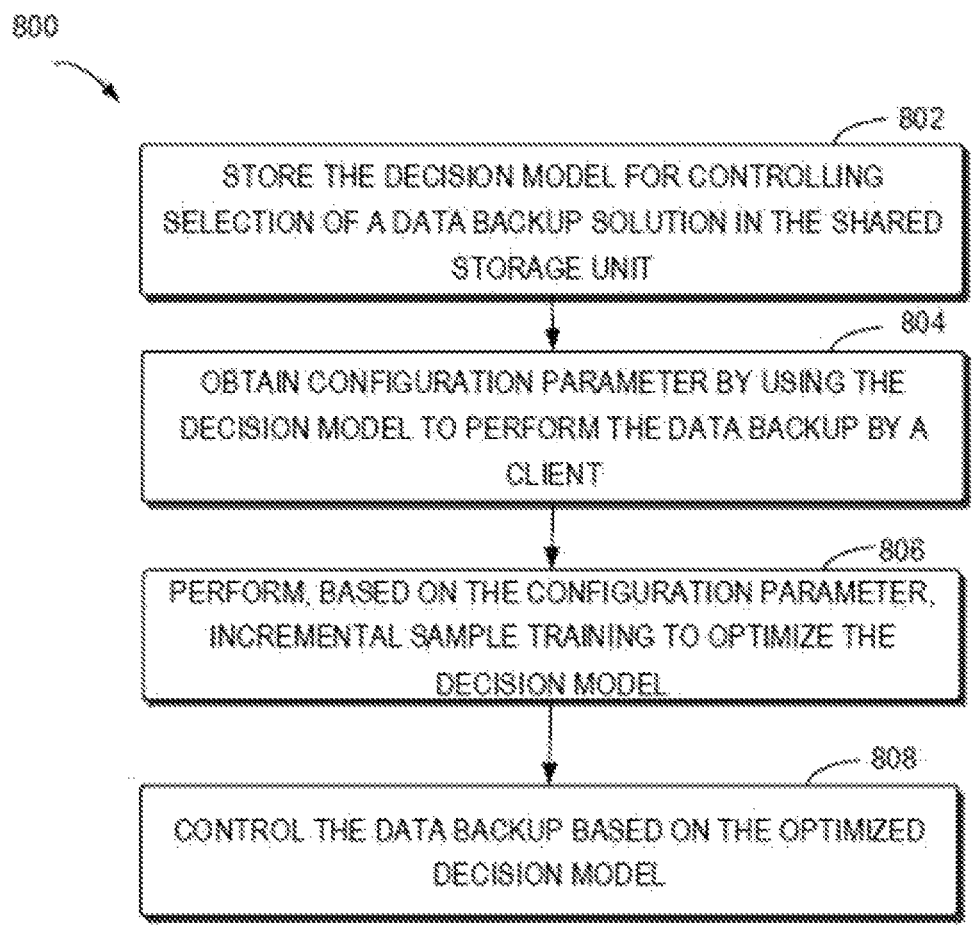
FIG. 8 illustrates a flow chart of a method 800 for controlling data backup according to an implementation of the subject matter described herein.

FIG. 8 illustrates a flow chart of a method 800 for controlling data backup according to an implementation of the subject matter described herein. The method 800 may be executed by the storage management server 60, for example, a controller or a processing device in the storage management server 60.

At block 802, the decision model for selecting a data backup solution is stored in the shared storage unit, and the decision model is associated with values of the plurality of factors affecting the data backup and corresponding backup solution. In some embodiments, the decision model 52 is stored in the shared storage device 50. The decision model 52 may be implemented by the acts from block 302 to block 306 in FIG. 3, or implemented by other acts. The decision model 52 is used to selecting a data backup solution and associated values of the plurality of factors affecting the data backup and corresponding backup solution, that is, correspondingly selects a matched backup solution according to the difference of values of the plurality of values.

At block 804, obtain configuration parameter by using the decision model to perform the data backup by the client. In some embodiments, this may be implemented in the manner of block 702 to block 706 shown in FIG. 7. As shown in FIG. 7, at block 702, the decision model 52 is stored in the shared storage device 50. At block 704, the client 70 uses the decision model 52 to perform data backup to obtain configuration parameters. At block 706, the storage server 60 obtains the client's configuration parameters, for example, by calling the client 70's home data.

At block 806, the incremental sample training is performed based on the configuration parameters to optimize the decision model. In some embodiments, this may be implemented in the manner of block 708 to block 712 shown in FIG. 7. At block 708, the incremental training sample is generated based on the client's configuration parameters. In some embodiments, the incremental training sample is generated by using the same operations as block 502 to block 506 as shown in FIG. 5. Then, at block 710, perform incremental training for the incremental training sample based on the aforesaid predetermined machine learning algorithm to optimize the decision model 52. At block 712, control data backup based on the optimized decision model 52. In some embodiments, for example, a Hoeffding decision tree update algorithm may be used to perform the incremental training for the newly-added training sample to optimize the decision model. Table 6 specifically illustrates an implementation of processing logic of the Hoeffding decision tree update algorithm. Emphatically, the implementation of subsequent processing logic is only an example and not intended to limit the scope of the present disclosure in many manners. Wherein S is a series of training samples. The training samples include two portions: one portion of training samples come from the training sample set generated based on comparison of the test data; the other portion of training samples are newly-added training samples generated based on the client's configuration parameters; X is a set of discrete attributes, namely, a set of factors affecting data backup; G(.) is a splitting evaluation function; δ is desired probability of choosing the correct attribute at any given node; n is times of independent observation; R is a real value range of a random variable range Xi, i is an attribute index; j is an index value of each attribute Xi.

TABLE 6

Let HT be a tree with a single leaf $l_1$ (the root)
Let $X_1 = X \cup \{X\varphi\}$
Let $\overline{G}_l(X_\varphi)$ be the $\overline{G}$ obtained by predicting the most frequent class in S
For each class $y_k$
   For each value $x_{ij}$ of each attribute $X_i \in X$
      Let $n_{ijk}(l_1) = 0$
For each example (x, $y_k$) in S
   Sort (x, y) into a leaf l using HT
   For each $x_{ij}$ in x such that $X_i \in X_l$
      Increment $n_{ijk}(l)$
   Label l with the majority class among the examples seen so far at l
   If the examples seen so far a l are not all the same class, then
      Compute $\overline{G}_l(X_i)$ for each attribute $X_i \in X_l - [X_\varphi]$ using the counts $n_{ijk}(l)$
      Let $X_a$ be the attribute with highest $\overline{G}_l$
      Let $X_b$ be the attribute with second-highest $\overline{G}_l$
      Compute ε using Equation:

$$\varepsilon = \sqrt{\frac{R^2 \ln\left(\frac{1}{g}\right)}{2n}}$$

If $\overline{G}_l(X_a) - \overline{G}_l(X_b) > \varepsilon$ and $X_a \neq X\varphi$ then
         Replace l by an internal node that splits on $X_a$
         For each branch of the split
            Add a new leaf $l_m$, and let $X_- = X - \{X_a\}$
            Let $\overline{G_m}(X_\varphi)$ be the $\overline{G}$ obtained by predicting the most frequent class at $l_m$
            For each class $y_k$ and each value $x_{ij}$ of each attribute $X_i \in X_- - [X\varphi]$
               Let $n_{ijk}(l_m) = 0$
Return HT At block 808, control data backup based on the optimized decision model. In some embodiments, the optimized decision model is stored on the shared storage device 50. The client 70 may directly obtain the optimized decision model 52 in the shared storage device 50, and use the optimized decision model 52 to control data backup. In some embodiments, a storage management server 60 obtains the optimized decision model 52 in shared storage device 50, and use the optimized decision model 52 to control client 70 to perform data backup. In some embodiments, decision model 52 can be optimized repeatedly by using the data generated during data backup online.

Figure 9:
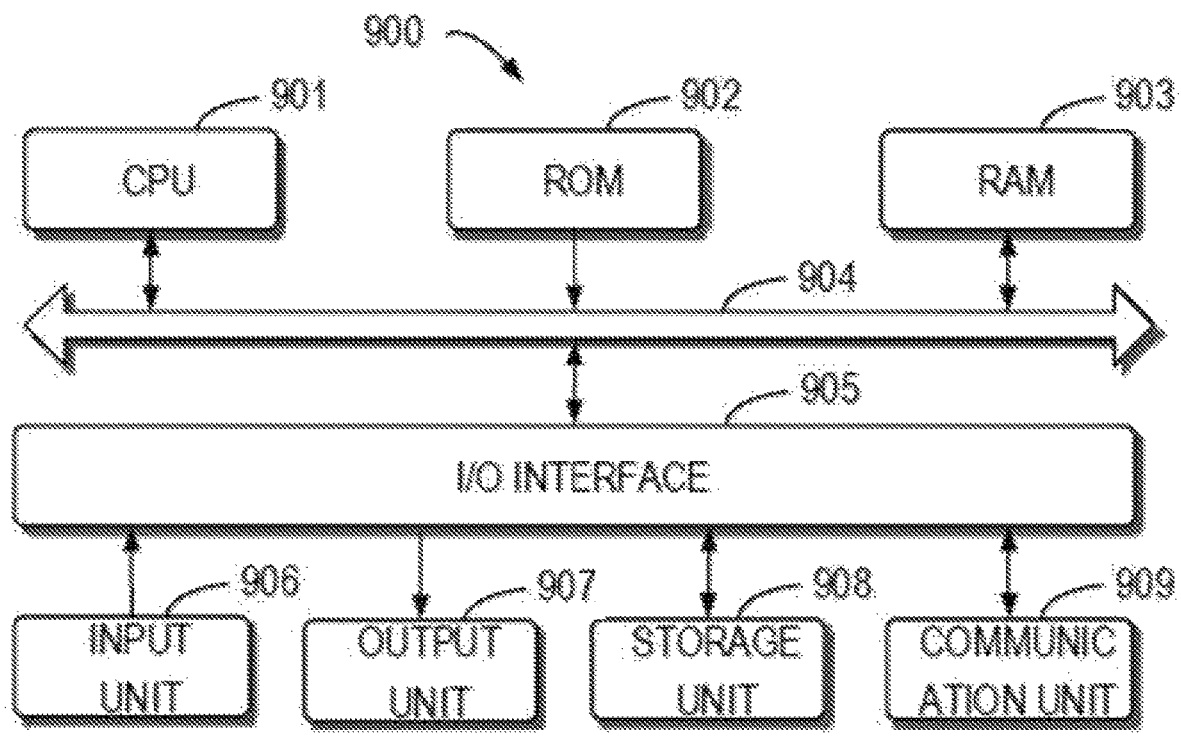
FIG. 9 illustrates a block diagram of an electronic device 900 adapted to implement an implementation of the subject matter described herein.

FIG. 9 illustrates a block diagram of an electronic device 900 adapted to implement an implementation of the subject matter described herein. The device 900 may be used to implement one or more hosts in the storage management server 60 of FIG. 1. As shown in the figure, the device 900 comprises a central processing unit (CPU) 901 which is capable of performing various actions and processes in accordance with a computer program instruction stored in a read only memory (ROM) 902 or a computer program instruction loaded from a storage unit 908 to a random access memory (RAM) 903. In the RAM 903 are stored various programs and data as required by operation of the device 900. The CPU 901, the ROM 902 and the RAM 903 are connected to one another via a bus 904. An input/output (I/O) interface 905 is also connected to the bus 904.

The following components of the device 900 are connected to the I/O interface 905: an input unit 906 including a keyboard, a mouse, or the like; an output unit 907 including various displays, loudspeakers and the like; the storage unit 908 such as a magnetic disk, an optical disk or the like; a communication unit 909 such as a network card, a modem, a wireless communication transceiver or the like. The communication unit 909 allows the device 900 to exchange information/data with other devices through a computer network such as the Internet and/or various telecommunication networks.

The processing unit 901 performs various methods and processing described above, for example, performs the methods 300 and 800 for controlling data backup. For example, in some embodiments, the method 300 and the method 800 may be implemented as a computer software program, which is stored in a machine-readable medium, for example the storage unit 908. In some embodiments, a part or the entire computer program may be loaded into and/or installed on the device 900 via the ROM 902 and/or communication unit 909. When the computer program is loaded to the RAM 903 and executed by the CPU 901, one or more operations of the method 300 and method 800 described above may be performed. Alternatively, in other embodiments, the CPU 901 may be configured in any other proper manners (e.g., by virtue of a firmware) to perform one or more actions of the method 300 and method 800.

Figure 10:
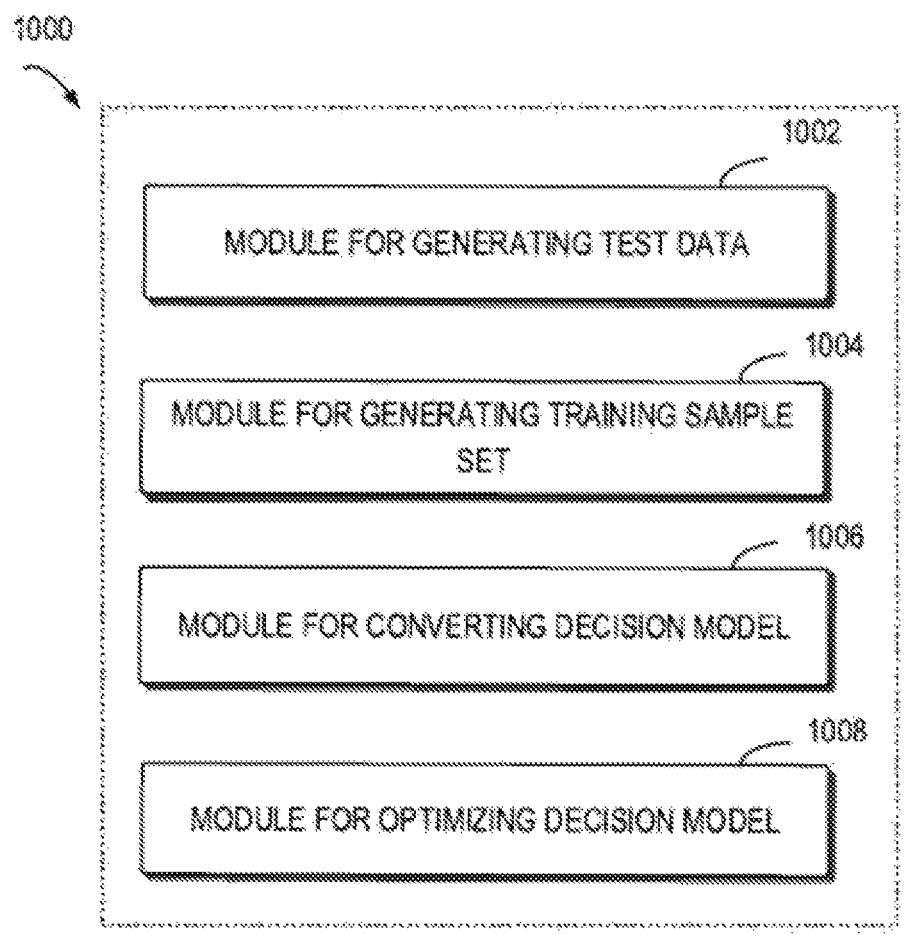
FIG. 10 illustrates a block diagram of an apparatus 1000 for controlling data backup according to an implementation of the subject matter described herein.

FIG. 10 illustrates a block diagram of an apparatus 1000 for controlling data backup according to an implementation of the subject matter described herein. In some embodiments, the apparatus 1000 comprises a plurality of modules, each module corresponding to a block in the method 300. In some embodiments, the apparatus may further be a computer program product. The computer program product is stored in a computer storage medium and includes a machine-executable instruction, the machine-executable instruction running in the apparatus so that the apparatus performs blocks or actions in the method 300. As shown in FIG. 10, the apparatus 1000 comprises: a module 1002 for generating test data which is configured to obtain test data for performing data backup with a plurality of backup solutions, the plurality of backup solutions being associated with each set of values in a plurality of sets of values of the plurality of factors affecting the data backup; a module 1004 for generating training sample set which is configured to generate a training sample set based on comparison of the test data; a module 1006 for converting decision model which is configured to convert the training sample set into a decision model for controlling data backup; and a module 1008 for optimizing decision model which is configured to optimize the decision model based on the configuration parameters obtained by performing data backup with the decision model to.

Figure 11:
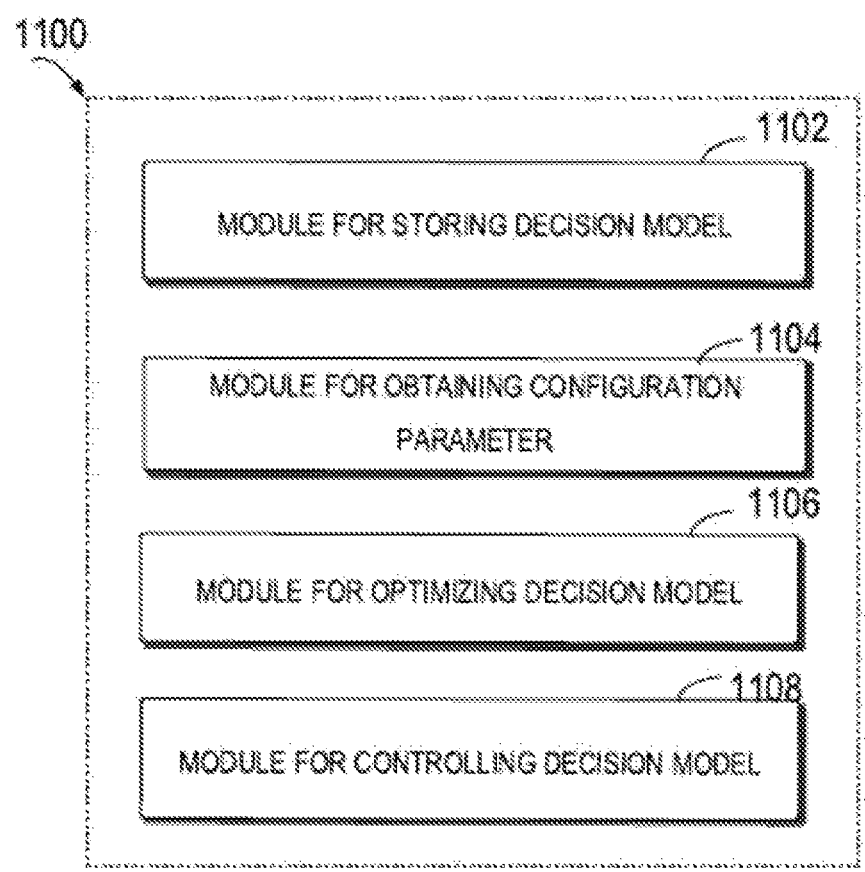
FIG. 11 illustrates a block diagram of an apparatus 1100 for controlling data backup according to another implementation of the subject matter described herein.

FIG. 11 illustrates a block diagram of an apparatus 1100 for controlling data backup according to another implementation of the subject matter described herein. In some embodiments, the apparatus 1100 comprises a plurality of modules, each module corresponding to an action in the method 800. In some embodiments, the apparatus may further be a computer program product. The computer program product is stored in a computer storage medium and includes a machine-executable instruction, the machine-executable instruction running in the apparatus so that the apparatus performs actions in the method 800. As shown in FIG. 11, the apparatus 1100 comprises: a module 1102 for storing decision model which is configured to store a decision model for controlling selection of a data backup solution on the shared storage unit, the decision model being associated with values of a plurality of factors affecting the data backup and their corresponding backup solutions; a module 1104 for obtaining configuration parameter which is configured to obtain the configuration parameter in a way that the client uses the decision model to perform the data backup; a module 1106 for optimizing decision model which is configured to perform, based on the configuration parameter, incremental sample training to optimize the decision model; and a module 1108 for controlling decision model which is configured to perform control of data backup based on the optimized decision model. Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The present disclosure may be a method, an apparatus, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A method of controlling data backup, the method comprising:
    obtaining test data for performing data backup with a plurality of backup solutions, the plurality of backup solutions being associated with each set of preset values amongst a plurality of sets of preset values for a plurality of factors affecting the data backup, wherein obtaining the test data includes generating the test data by performing, based on each set of preset values for the plurality of factors, data backup procedures between a first data storage system and a second data storage system with each one of the plurality of backup solutions, and wherein the test data includes time for performing each of the data backup procedures between the first data storage system and the second data storage system;
    generating a training sample set based on comparison of the test data, wherein generating the training sample set includes:
        for each set of preset values, comparing time for performing the data backup between the first data storage system and the second data storage system with different backup solutions in the test data,
        selecting a backup solution with which the time for performing the data backup between the first data storage system and the second data storage system is lower than a threshold value, and
        generating a training sample of the training sample set based on the selected backup solution and the associated set of values for the plurality of factors;
    converting the training sample set into a decision model for controlling data backup by a client and storing the decision model into a shared storage unit;
    optimizing the decision model based on configuration parameters obtained at least in part by performing, by the client, data backup with the decision model, wherein optimizing the decision model includes performing incremental sample training based only on the configuration parameters, and wherein performing the incremental sample training includes:
        generating an incremental training sample based only on the configuration parameters, and
        training the incremental training sample based on a machine learning algorithm that enables multi-variable system classification and supports incremental learning of newly-added data; and
    wherein the configuration parameters obtained by performing data backup with the decision model are obtained by:
        performing, by the client, the data backup online with the decision model stored in the shared storage unit, and
        collecting, by a storage management server, the configuration parameters of the client online.

2. The method according to claim 1, wherein the factors include at least one of the following: a size of data to be backed up, a proportion of new bytes relative to last backup data, an average storage segment size, a minimum storage segment size, a maximum storage segment size, a total number of storage segments, the number of files to be backed up, a bandwidth of a network between a device performing backup and a device to be backed up, and a network round-trip time (RTT) between the device performing the backup and the device to be backed up.

3. The method according to claim 1, wherein converting the training sample set into a decision model for controlling data backup comprises:
    converting, based on a Very Fast Decision Tree (VFDT), the training sample set into a decision tree with the factors as attributes.

4. The method according to claim 3, wherein an internal node of the decision tree represents one of the factors, a leaf node represents a backup solution for controlling data backup, and a branch from the internal node to the leaf node represents a class based on a range of values for backup environment variables.

5. The method according to claim 1, wherein the decision model is a decision tree with the factors as attributes; and
    wherein training the incremental training sample comprises:
        determining splitting of an internal node in the decision tree according to a Hoeffding boundary by calculating an information gain for an attribute of the incremental training sample.

6. The method according to claim 1, wherein performing data backup procedures between the first data storage system and the second data storage system with each one of the plurality of backup solutions comprises performing real data backup procedures between the first data storage system and the second data storage system with all of the backup solutions.

7. A system for controlling data backup, comprising:
    a storage unit configured to store one or more programs and a decision model for controlling selection of a data backup solution; and a processor coupled to the storage unit and configured to execute the one or more programs to cause the system to perform acts including:
  obtaining test data for performing data backup with a plurality of backup solutions, the plurality of backup solutions being associated with each set of preset values amongst a plurality of sets of preset values for a plurality of factors affecting the data backup, wherein obtaining the test data includes generating the test data by performing, based on each set of preset values for the plurality of factors, data backup procedures between a first data storage system and a second data storage system with each one of the plurality of backup solutions, and wherein the test data includes time for performing each of the data backup procedures between the first data storage system and the second data storage system;
  generating a training sample set based on comparison of the test data, wherein generating the training sample set includes:
    for each set of preset values, comparing time for performing the data backup between the first data storage system and the second data storage system with different backup solutions in the test data,
    selecting a backup solution with which the time for performing the data backup between the first data storage system and the second data storage system is lower than a threshold value, and
    generating a training sample of the training sample set based on the selected backup solution and the associated set of values for the plurality of factors;
  converting the training sample set into a decision model for controlling data backup by a client and storing the decision model into a shared storage unit;
  optimizing the decision model based on configuration parameters obtained at least in part by performing, by the client, data backup with the decision model, wherein optimizing the decision model includes performing incremental sample training based only on the configuration parameters, and wherein performing the incremental sample training includes:
    generating an incremental training sample based only on the configuration parameters, and
    training the incremental training sample based on a machine learning algorithm that enables multi-variable system classification and supports incremental learning of newly-added data; and
  wherein the configuration parameters obtained by performing data backup with the decision model are obtained by:
    performing, by the client, the data backup online with the decision model stored in the shared storage unit, and
    collecting, by a storage management server, the configuration parameters of the client online.

8. The system according to claim 7, wherein the factors include at least one of the following: a size of data to be backed up, a proportion of new bytes relative to last backup data, an average storage segment size, a minimum segment size, a maximum storage segment size, a total number of storage segments, the number of files to be backed up, a bandwidth of a network between a device performing backup and a device to be backed up, and a network round-trip time (RTT) between the device performing the backup and the device to be backed up.

9. The system according to claim 7, wherein converting the training sample set into a decision model for controlling data backup comprises:
  converting, based on a Very Fast Decision Tree (VFDT), the training sample set into a decision tree with the factors as attributes.

10. The system according to claim 9, wherein an internal node of the decision tree represents one of the factors, a leaf node represents a backup solution for controlling data backup, and branch from the internal nodes to the leaf node represents a class based on a range of values for backup environment variables.

* * * * *